United States Patent [19]

Pollock

[11] Patent Number: 4,885,985
[45] Date of Patent: Dec. 12, 1989

[54] SELF REGULATING GRAIN BIN WALL AIR SYSTEM AND METHOD

[75] Inventor: Eugene B. Pollock, Shelby, Ill.

[73] Assignee: Grain Systems, Incorporated, Assumption, Ill.

[21] Appl. No.: 170,902

[22] Filed: Mar. 21, 1988

[51] Int. Cl.⁴ .............................................. E04H 7/22
[52] U.S. Cl. ......................................... 98/55; 34/232; 34/233
[58] Field of Search ................. 34/232, 233, 235, 209; 98/55

[56] References Cited

U.S. PATENT DOCUMENTS 2,634,672  4/1953  Maho ........................................ 98/55
2,849,806  9/1958  Grahek ................................. 98/55 X Primary Examiner—Henry A. Bennet
Attorney, Agent, or Firm—Polster, Polster and Lucchesi

[57] ABSTRACT

A grain drying system around the interior of a grain bin wall which dries grain adjacent the bin wall while minimizing air and heat loss above the level of grain stored in a bin is disclosed. The system is self-regulating and limits air flow to areas above the level of the grain in response to changes in grain level or air pressure in the system. In the grain drying system, vertical air passageways or tubes extend about the interior of the bin wall. The elongated passageways, which have air diffusing or outlet areas, are arranged in fluid communication with a plenum chamber below an air permeable grain supporting subfloor in the grain bin. Each of the passageways or tubes has a movable float slidable therein. When pressure in the plenum chamber reaches a pressure equal to or greater than a predetermined level at which the floats are calculated to operate, the floats then rise within the air passageways until equilibrium with grain created air resistance is reached. Of course, the grain created air resistance is dependant on the level or depth of the grain in the bin above the sub-floor. The air floats automatically and substantially block or the limit air flow above the level of the grain in the grain bin, and a more efficient operating aeration and drying system is provided without unnecessary air and heat loss. In addition to the aforementioned system, a method of drying grain around the interior of a grain bin wall while minimizing air and heat loss above the level of grain stored in the bin is also disclosed.

10 Claims, 2 Drawing Sheets

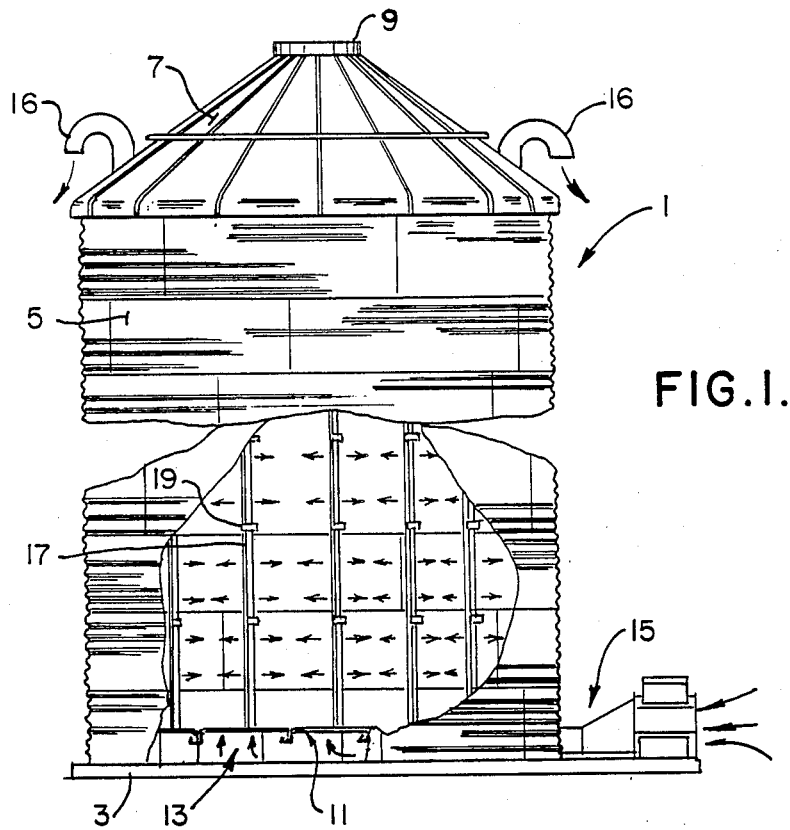
FIG.1.
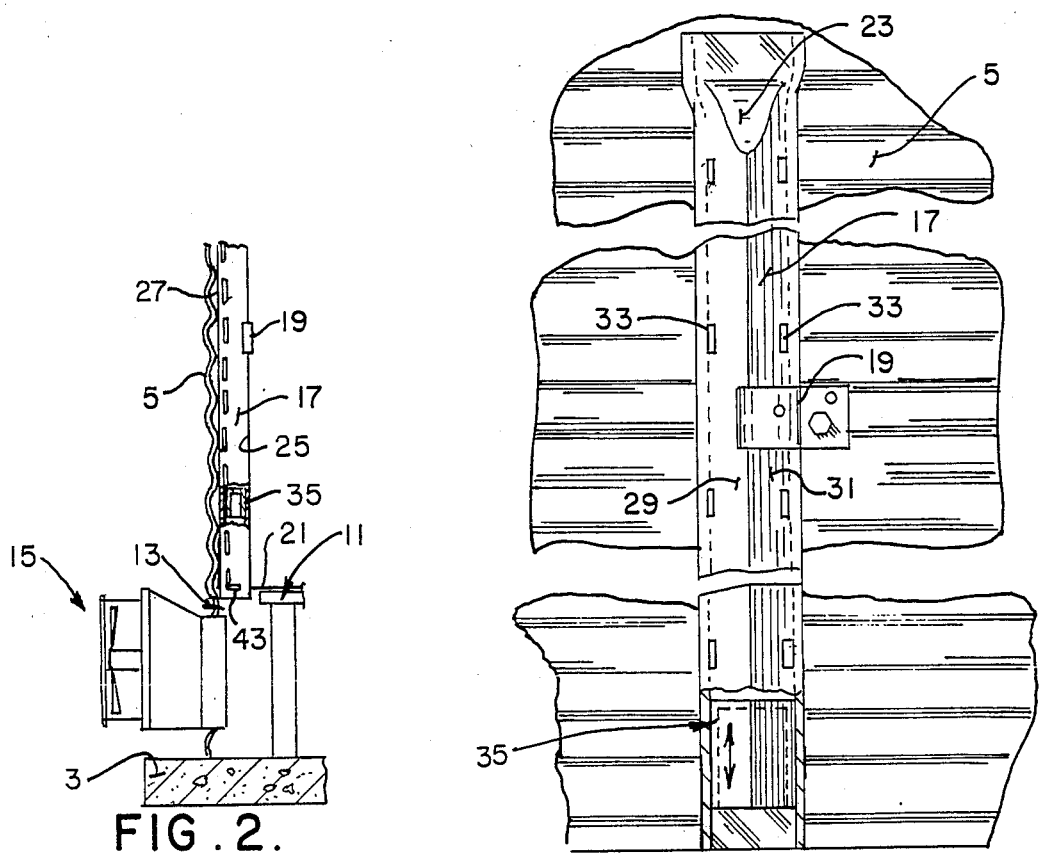
FIG.2.
FIG.3.

SELF REGULATING GRAIN BIN WALL AIR SYSTEM AND METHOD

BACKGROUND OF THE INVENTION

This invention relates to a grain drying system and method for drying grain around the interior of a grain bin wall while minimizing air and heat loss above the level of grain stored in the bin.

When grain is harvested, it has a percentage by weight of water making up its composition. In order to bring the moisture content of grain to a safe, storable level to prevent spoilage, grain drying is commonly used. If the amount of moisture is too high, mold can form and the grain will break down and possibly promote insect infestation. Therefore, a drying bin enclosed by walls and roof is used to dry the grain. In the typical grain bin drying installation, heated dry air is forced upwardly from a plenum chamber through an air permeable subfloor upon which the grain is supported. A fan and air heater assembly located outside of the grain bin blows heated air into the plenum chamber below the air permeable subfloor. The heated, dry air removes moisture from the grain and continues upwardly to the bin roof where it escapes to the atmosphere through vents in the bin roof. In order to assure grain quality stored for extended periods, it is necessary to maintain a predetermined moisture content of the grain by using maintenance levels of heated dry air in the grain bin, as will be apparent.

Although the aforementioned grain drying system works quite well, where colder climates are encountered, spoilage can occur in grain located near the bin wall, due to condensation forming on the side wall when the outside temperature drops. In addition, grain is sometimes more densely compacted along the interior of the bin wall. To overcome the problem of grain spoilage along the interior of the bin wall, a variety of solutions have been offered. One type of equipment, as shown in U.S. Pat. Nos. 3,531,874 and 4,009,520, employs a plurality of perforated, vertical tubes which are mounted on the interior of the bin wall and communicate with a dry air source for introducing dry air into the grain bin along the interior of the bin wall. Another type of equipment uses perforated corrugated sheets mounted to the bin wall which also communicate with a dry air source to introduce dry air into the grain adjacent to the grain bin interior wall.

While the problem of grain spoilage along the interior of the grain bin wall has been substantially alleviated with such aforementioned equipment, they have nonetheless created a problem of wasted air and heat loss when the grain bin is not full. For example, if the perforated tubes or sheets (i.e., air passageways) extend to a height of 10 feet above the bin subfloor and the grain level is only 5 feet above the subfloor, most of the heated dry air passing through such perforated tubes (or sheets) escapes from the tubes above the grain level to escape through the vents the bin roof, without coming into contact with any of the grain along the grain bin wall. Using information for resistance of grains and seeds to air flow, with information concerning air flow in passageways at various pressures, it is estimated that a typical grain bin equipped with prior art bin wall air ducting systems may be losing in excess of 20 percent of total air and heat introduced into the plenum chamber under extreme conditions. The opportunity for substantial cost savings, while utilizing wasted heat and air, would be available with an equipment system and method which avoids the aforementioned deficiencies of currently available prior art equipment.

SUMMARY OF THE INVENTION

Among the several objects and features of this invention may be noted the provision of a grain drying system around the interior of a grain bin wall which provides improved grain aeration and drying along the grain bin wall while substantially reducing operating costs;

The provision of such a system in which grain along the interior of the grain bin wall is properly conditioned during the operation of equipment providing dry heated air, without unnecessary air and heat loss;

The provision of such a system in which previously wasted air and heat may now be put to work so as to increase grain drying rates, require less time to dry, maintain the grain in the required condition, and to promote additional savings;

The provision of such a system which provides increased efficiency by reducing air and heat loss to the free area above the grain while assuring pressurized air flow into the grain along the interior of the bin wall;

The provision of such a system in which the system is self-pressure regulating and automatically limiting in response to a predetermined level of grain in the grain bin, regardless of depth or kind of commodity kept in the grain bin; and The provision of such a system which is essentially frictionless, has little or no maintenance, utilizes a minimum number of parts, is simple and easy to fabricate, is economical, is easy to install and maintain, is highly efficient, and is otherwise well adapted for the purposes intended.

Briefly stated, a grain drying system of the present invention is used in a grain bin construction which has a foundation floor, and a bin wall supported on the foundation floor. A plurality of generally vertical extending and circumferentially spaced elongated tubes or air passageways extend about the interior of the bin wall. Each of the air passageways has a plurality of air diffusing or outlet areas, such as perforated openings in the conduit containing the passageways, to direct air flow from the air passageways at least partially laterally along the interior of the bin wall. Suitable means, such as a fan and heater assembly located outside of the grain bin and a plenum chamber or manifold, introduces dry heated air into the air passageways in order to dry grain along the interior of the bin wall. For reducing heat and air loss through those diffusing areas of the air passageways above the level of the grain within the grain bin, means are operatively associated with the air tubes or passageways for automatically limiting the air flow through those air diffusing areas above the level of the grain in the grain bin. Such air limiting means preferably includes air float means which operate in the air passageways to limit air flow to those air diffusing areas above the grain level in response to the level of the grain within the bin. The air float means moves in the air passageways in response to a rise or fall of the depth or level of the grain in the bin until it reaches equilibrium with grain created air resistance pressure in the plenum chamber. The air float means limits the flow of heated dry air into the free space above the grain level in the grain bin.

In addition to the aforesaid drying system, a method of drying grain of the present invention around the interior of a grain bin wall while minimizing heat loss above the level of grain stored in the bin includes introducing pressurized dry air into the grain from below the grain and along the interior of the grain bin wall. The method further includes the step of automatically restricting the flow of pressurized dry air, as well as the step of self regulating the flow of pressurized air along the interior of the bin wall in response to the level of grain in the grain bin, based on a predetermined air pressure equilibrium that is reached which is dependent on the depth of the grain in the bin.

Other objects and features of this invention will become apparent from the insuing description.

BRIEF DESCRIPTION OF THE DRAWINGS

FIG. 1 is a fragmentary front elevational view of a grain drying bin which incorporates the grain drying system of the present invention, with part of the bin cut away to illustrate the present invention, having a plurality of vertically disposed air tubes disposed along the inner face of the bin wall for ducting heated air from a plenum and directing it generally circumferentially along the inner face of the bin walls;

FIG. 2 is a fragmentary side elevational view, partly in section, along the interior of the grain bin wall;

FIG. 3. is a fragmentary front elevational view, partly in section, illustrating one of the hollow conduit members, with an air float therein, attached to the interior of the grain bin wall;

Corresponding references characters indicate corresponding parts throughout the several views of the drawings.

DESCRIPTION OF THE PREFERRED EMBODIMENT

Figure 5:
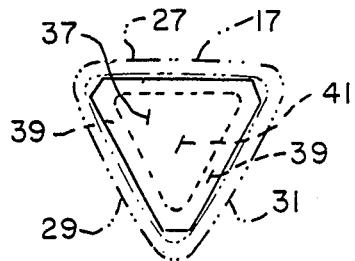
FIG. 5 is a top plan view of the hollow conduit (shown in phantom) and air float (shown in solid lines) assembled to one another, as shown in FIG. 3.

Referring now to the drawings, a grain bin, generally indicated at 1, is preferably secured to a poured concrete foundation floor or pad 3 and has cylindrical side walls 5 of corrugated sheet-metal panels with the corrugations running circumferentially around the grain bin. While most bins are mounted on a poured concrete foundation floor, it will be understood that, within the broader aspects of this invention the term "foundation floor" is not limited to a poured concrete floor and may include even a dirt floor. The bin has a generally conical roof 7 also formed of sheet metal panels in the configuration shown with a center opening 9 at the top through which grain is loaded into the bin. Although not shown, it is also conventional to provide suitable doors in the side walls and the roof of the bin, as may be desired.

The preferred construction of grain bin 1 includes an air permeable grain supporting subfloor 11 which may be constructed in any manner desired, spaced from the foundation floor 3 and defining therebetween a plenum chamber 13. While the air permeable grain supporting subfloor 11, per se, forms no part of the present invention, one preferred construction of the subfloor includes channel-shaped floor member which are interlocked in side-by-side abutting relationship, as shown, for example, in Reissue Patent 31,368, which is incorporated by reference herein. A fan and heater unit 15 is connected to the plenum chamber 13 through an opening in the side wall 5 of the bin to blow air (either heated or of ambient temperature) in through the plenum chamber 13 under a relatively low static head pressure of water. Such fan and heater unit 15 and plenum chamber 13 constitutes means for introducing air into air passageways 25 in a manner as will hereinafter appear. In conventional constructions, air in the plenum chamber 33 is exhausted upwardly through the air permeable grain supporting subfloor 11 and rises through in the grain bin 1 to dry, aerate or otherwise condition the grain. The air is exhausted from the bin 1 through the center opening 9 in the roof 7 or through roof vents 16.

As previously explained, in colder climates, condensation forming on the bin wall 5, as well as closely packed grain along the interior of the bin wall 5, has resulted in the problem of grain spoiling. As best shown in FIGS. 1 and 2, the present invention employs a plurality of generally vertically extending and circumferentially spaced hollow tubes or conduits 17 which are attached to the interior of the bin wall 5 at substantially equal angular intervals by the use of brackets 19, as will be understood. The lower ends of the hollow conduits 17 extend into the plenum chamber 13 to permit fluid communication therewith. For example, a thirty foot diameter grain bin may have 120 conduits affixed to the bin wall. Bin floor flashing 21, mounted to the air permeable grain supporting subfloor 11, surrounds each of the hollow conduits 17 at their lower end, as shown in FIG. 2.

Figure 4:
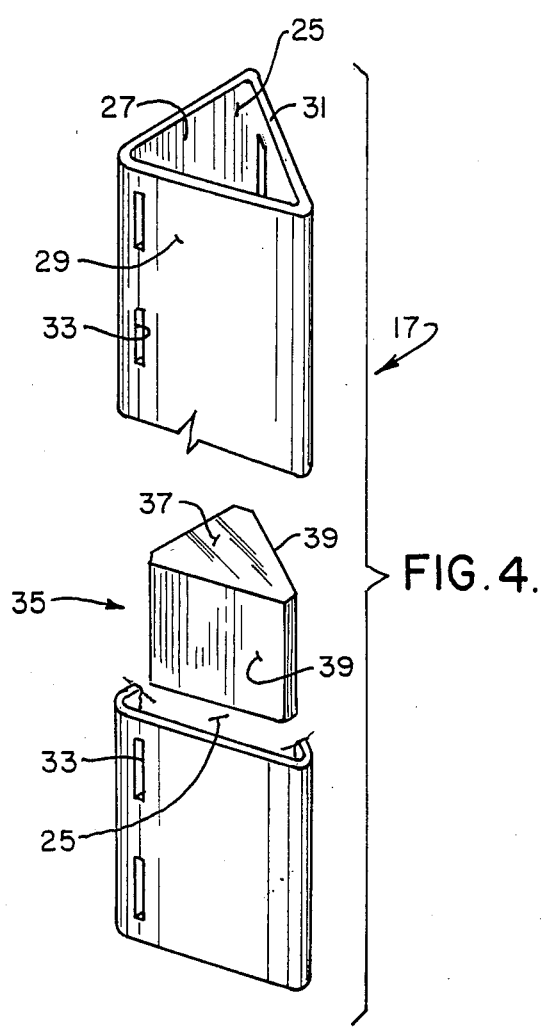
FIG. 4 is an exploded fragmentary isometric view on an enlarged scale illustrating the preferred construction of one of the hollow conduit members and air float of the present invention.
Figure 6:
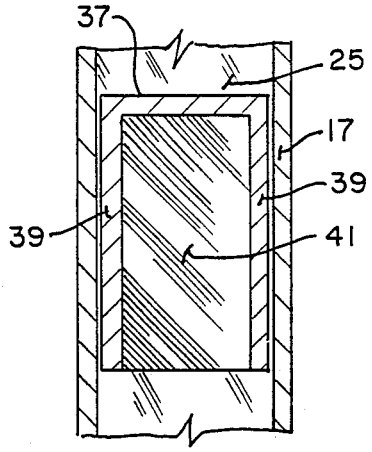
FIG. 6 is a fragmentary side cross sectional view, illustrating the manner in which the air float operates within the hollow conduit members of the present invention.

As best seen in FIG. 3, each of the hollow conduits 17 have an upper end 23 which is a pinched-off closed end of the hollow conduit or tube 17. Of course, other suitable closure means may be employed at the upper end of the conduit. Preferably, hollow conduit 17 is formed as a rigid plastic member and is profile extruded into a generally triangular configuration as illustrated in the drawings, thus allowing the pinched-off closed end 23 to take the shape as shown in FIG. 3. Within the broader aspects of this invention conduits of almost any cross section may be used. Each of the hollow or tubular conduits 17 has an air passageway 25 extending throughout the entire elongated length thereof from slightly below the air permeable grain supporting subfloor 11, as shown in FIG. 2, and extending generally vertically upwardly therefrom to a predetermined distance, selected by the customer of the grain bin 1. The generally triangular configuration of the hollow conduit or tube member 17, as best seen in FIG. 4, includes a back or rear wall 27 which is attached to the cylindrical side bin walls 5, and angularly offset and intersecting triangular sides 29, 31. Thus, the elongated air passageway 25 also has a hollow internal triangular shape which conforms to the internal wall configuration defined by the back or rear wall 27 and side walls 29 and 31 of the hollow conduit 17. In each of the angularly offset intersecting triangular side walls 29, 31 of the hollow conduit 17, there is provided a plurality of shaped air diffusing perforations or outlets 33. These air diffusing perforations or areas 33 in the hollow conduit 17 direct air flowing in the air passageways 25 generally laterally (circumferentially) along the interior of the bin wall 5, in order to introduce aerated and heated air into grain which may be subject to condensation or compaction along the bin side wall 5.

Within the broader aspects of this invention, conduits 17 may be of any desired configuration or cross section, and passageways 25 may be incorporated in sheets (not shown) in proximity to the inner surface of the bin wall.

As described above, in prior art constructions which use similar or equivalent air tube designs for directing heated air laterally along the interior of the bin wall, the problem of grain spoilage along the grain bin wall has been substantially alleviated. In many instances, the depth of the grain in the bin when the drying or aerating system is in operation may be considerably less than the height of the air passageways around the bin walls. In those cases where the air tubes extend above the level of the grain, the majority of the heated dry air passing through such air tubes may be exhausted from outlet areas 33 above the level of the grain without coming into drying contact with the grain. This heated air rises to the bin roof 7 and then be exhausted via the opening 9, or vents 16, without coming into contact with any grain along the interior of the bin wall 5. Not only are such systems extremely inefficient, but substantial wasted air and heat loss has occurred which is, of course, undesirable.

The present invention solves the aforementioned deficiencies of the prior art air tubes or similar equivalent constructions which have been used to direct dry heated air along the interior of bin walls in grain bins. In accordance with the important features of the present invention, air float means 35 are employed for operative association with the air passageways 25 of the hollow conduits 17 for automatically limiting the air flow to those air diffusing perforations or areas 33 above the level of grain in a grain bin. Specifically, the air float means 35 has a corresponding triangular shape which is complementary to, but slightly smaller than, the triangular shaped air passageways 25 in the triangular configured hollow conduits 17, as best seen in FIGS. 3-5 of the drawings. Of course air float means for passageways of other cross sections would be of a corresponding cross section. The air float means 35 has a hollow body construction defined by an end or top section 37 with depending triangular side walls 39 so as to provide an inner triangular shaped hollow opening or recess 41 therewithin. As a result of the slightly smaller, but generally triangular shape of the air float means 35, the air float means 35 can move freely within the triangular shaped slightly larger passageway 25 of the hollow conduit in a self-aligned and guiding relationship, producing therein, nonbinding movement, for purposes now to be described.

Figure 7:
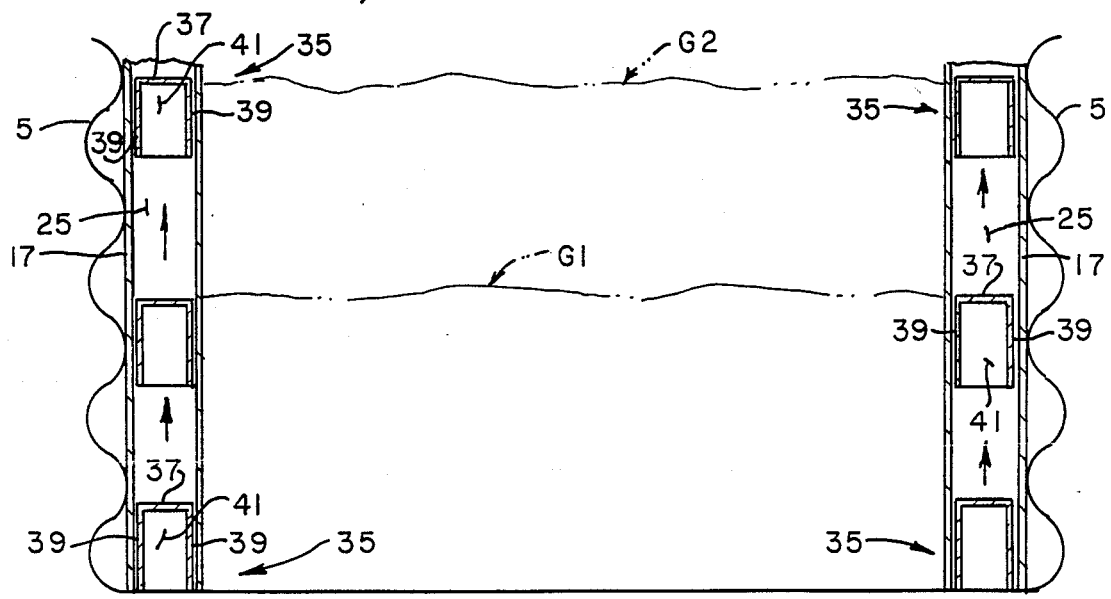
FIG. 7 is a partial vertical sectional view across the grain bin wall and illustrating the operation of the air float means within hollow conduit members in accordance with the teachings of the present invention.

Referring now to FIG. 7 of the drawings for a description of the operation of the air float means 35 within the hollow conduits 17, it will be seen that the air float 35 is shown at a plurality of positions within the hollow conduits 17, based on the level of the grain. Specifically, the lower position of the air float 35 as seen in FIG. 7 assumes that there is no air pressure within the plenum chamber 13, and thus, the air float 35 is resting on a float pin or stp 43, as shown in FIG. 2 of the drawings. The float pin or stop 43 serves to limit lower travel of the air float 35, in the absence of air pressure in the plenum chamber 13. When air under pressure is introduced into the plenum chamber 13 by fan 15, air will also be introduced into the lower ends of the air passageways 25 of the hollow conduits or tubes 17, thus applying air pressure against air floats 35 to cause them to rise within the hollow conduits 17. Each air float 35 is designed and calculated to float at a given or predetermined pressure which corresponds to the back pressure or resistance of airflow through the grain at the level of the grain in the bin. When a predetermined level of grain identified as G1 in FIG. 7, is placed in the grain bin, air resistance in the grain is increased, and therefore, the pressure in the plenum chamber 13 also correspondingly increases due to increased back pressure. When the pressure in the plenum chamber 13 reaches a pressure equal to or greater than the amount at which the float 35 is calculated to rise, the float then floats or rises within the hollow conduit 17. As the float rises, certain of the lower outlet areas 33 are exposed and air is discharged therefrom under pressure into the grain along the bin walls. The float will continue to rise until it comes into equilibrium with grain created air resistance at a level generally corresponding to the level of the grain in the bin. As seen in FIG. 7, with the grain level at G1, the air floats 35 will move into position preferably (but not necessarily) slightly below the level of the grain mass G1, thus following the top of the grain mass G1. The float blocks the flow of air within the passageways above the level of the grain and prevents the escape of heated air from outlets above the level of the float. As grain is added to the level of G2, air resistance in the grain is increased, with a consequent increase in the pressure in the plenum chamber 13. In this case as well, the air float 35 correspondingly (automatically) rises, but stops slightly below the top of the grain mass G2, as illustrated.

As the float 35 rises within the air passageway 25 of its respective hollow conduit 17, it exposes more air diffusing perforations or areas 33 to allow continued drying and aeration of the grain along the interior of the air bin wall 5. However, due to the end or top section 37 of the air float 35, substantially little or no dry air will flow past the air float 35 and into communication with those air diffusing areas 33 which are above the grain level in the grain bin. Thus, the air float 35 serves to reduce air and heat loss through those air diffusing areas 33 which extend above the level of grain in the grain bin, and it does so through a self-regulating and automatic limiting system in response to a predetermined level of pressure in the plenum chamber 13. The previously wasted air and heat in other systems may now be used so as to increase drying rates, requiring less time to dry and then maintain the grain in the required condition. When the amount of pressurized dry air flow into the grain is adjusted in response to the level of grain stored in the grain bin, the air floats 35 similarly automatically adjust and regulates themselves within their respective conduits 17 to positions in equilibrium with the grain created air resistance. This more efficient system and method not only improves grain aeration and drying so as to reduce grain loss due to spoilage, but also substantially reduces operating costs in the air drying of grain in grain bins. Estimated savings of (of heated air up to twenty) percent or more may be realized with the system of this invention, as compared to prior art bin wall air drying systems in extreme circumstances. The operation of such new and improved air drying systems and methods of the present is particularly significant with the 24 hour operation of such equipment on modern farms.

Within the broader aspects of this invention, the term "drying" shall be understood to include any operation of a grain bin in which air is introduced into the grain through the perforated subfloor, whether the air introduced is for the purpose of drying, aerating, conditioning, or cooling the grain.

As herein described, the preferred embodiment of the self-regualting grain bin wall air system and method of the present invention is employed within a grain bin 1 having a subfloor 11 raised above foundation floor 3 thereby to define plenum chamber 13. However, those skilled in the art will recognize that this invention may also be employed with grain bins or other storage vessels which do not use such a subfloor. For example, in so-called flush floor grain bins, the grain bin rests on a flat concrete floor or slab which also supports the grain. Such concrete floors may have ducts or channels cast-in-place with these ducts covered by a perforated metal plate (not shown) with the plates being flush with the floor. Air is often blown into these ducts and into the grain from a suitable fan or blower arrangement similar to fan 15 hertofore described. In accordance with the present invention, an array of hollow conduits 17 may be installed of the inside of the bin wall in the manner hertofore described. The bottom ends of these conduits may be connected to a suitable manifold (not shown) which in turn may be in communication with the cast-in-place ducts such that air under pressure may be introduced into air passageways 25.

Alternatively, in bins which do not have a subfloor 11 of the like, a suitable manifold (not shown), such as a ring of relatively large diamenter plastic pipe (e.g., four inch diameter) may extend around the bin wall at the juncture of the bin wall and the floor. The lower ends of conduits may be inserted into appropriate openings in the manifold. The manifold, of course, may be connected to an appropriate source of air (heated or ambient) under pressure such that the floats 35 in air passageways 25 operate in the manner heretofore described. It will be understood the this manifold is the equivalent of plenum chamber 11 hertofore described.

In view of the above, it will be seen that the several objects of the invention are achieved and other advantageous results are obtained.

As various changes could be made in the above constructions and methods without departing from the scope of the invention, it is intended that all matter contained in the above description or shown in the accompanied drawings shall be interpretative as illustrative and not in a limiting sense.

I claim:

1. In a grain bin having a bin wall supported on said foundation floor, a plurality of generally vertically extending, elongated air passageways within said bin, each of said air passageways having a plurality of air outlets which direct air flow from the air passageways generally into the grain along the length of the air passageway, and means for introducing air into said air passageway, and means for introducing air into said air passageways for discharge from said spaced outlets thereby to dry grain in proximity to said air passageways, the improvement comprising: means for automatically limiting the air flow through said air outlets in said air passageways above the level of the grain in the grain bin in response to changes in the level of the grain in said grain bin, said air loss reduction means associated with each of said air passageways comprising air float means in each of said air passageways to limit air flow to those outlets in said air passageways above the grain level in response to pressure changes within said air passageways.

2. The improvement as defined in claim 1 wherein said grain bin further has a foundation floor and an air permeable sub-floor spaced above said foundation floor thereby defining a plenum chamber therebetween, said air introduction means being in communication with said plenum chamber thereby to force air through said permeable sub-floor and into said air passageways, said air float means rising or falling within their respective said air passageways until they reach equilibrium with grain created air resistance pressure in said plenum chamber.

3. The improvement as defined in claim 2 wherein each said air float means has an end section which extends transverse to its said air passageway and against which air pressure is directed.

4. The improvement as defined in claim 3 wherein the air float means has an outer shape which is configured and dimensioned relative to said air passageway to permit non-binding movement thereof within said air passageway in response to change in pressure in said plenum chamber.

5. The improvement as defined in claim 4 wherein each said air passageway is provided in a respective hollow conduit member having a generally triangular cross section, and the outer shape of said air float means has a corresponding triangular cross section to provide self-aligned guiding movement within its said hollow conduit member.

6. The improvement as defined in claim 5 wherein said spaced outlets in said air passageways comprise spaced air diffusing perforations formed in said hollow conduit members.

7. The improvement as defined in claim 6 including means for limiting lower travel of the float means within said conduit members.

8. A grain drying system for grain bins having a foundation floor, a bin wall supported on said foundation floor, an air permeable grain supported sub-floor spaced from the foundation floor and defining therebetween a plenum chamber, said sub-floor and bin wall containing grain to be dried, a plurality of generally vertically extending, elongated air passageways positioned within said grain and being in fluid communication with air from within the plenum chamber, each of said air passageways having a plurality of spaced outlet areas which direct air flow from the air passageways into said grain, means for introducing air under pressure into said plenum chamber and through said air permeable subfloor and into said air passageways, and means operatively associated with said air passageways for automatically limiting the air flow through those outlet areas in said air passageways which extend above the level of grain in the grain bin in response to changes in the level of the grain in the bin, whereby air loss through those outlet areas above the grain in the grain bin is minimized.

9. A method of drying or conditioning grain in a grain bin, the latter being supported on a foundation floor and having a generally cylindric bin wall extending upwardly from said foundation floor, said bin having a plenum chamber, a heater/fan assembly for introducing heated air under pressure into said plenum chamber, a plurality of air passageways extending generally vertically at spaced intervals within said bin, said air passageways bring in fluid communication with said plenum chamber and having a plurality of spaced outlets therealong for discharging air from said plenum chamber into said grain, wherein the method comprises the steps of:

Providing air float means in each of said air passageways which is slidably, sealably movable within its said air passageway; and Selecting the weight and cross-sectional areas of each said air float means such that said air float means rise and fall within said air passageways to equalibrium positions within said air passageways corresponding generally to the level of the grain in said bin, said air float means substantially blocking the flow of air through said passageways above the level of said grain.

10. A method of drying or conditioning grain in a grain bin while minimizing air loss above the level of the grain in the bin, said bin having a plurality of generally vertically extending air passageways within said bin, each said air passageways being at least in part within said grain, said air passageways having a plurality of air discharge openings therealong, said method comprising the steps of: introducing air under pressure into said air passageways such that the air is discharged from said air discharge openings into the grain along the length of said air passageways;

varying the pressure of the air introduced into said air passageways in response to changes in the level of the grain in the grain bin; and automatically limiting the air flow through said air discharge openings above the level of the grain in the grain bin in response to changes in the level of the grain in the grain bin.

* * * * *